(12) United States Patent
Fukasaku et al.

(10) Patent No.: US 7,649,296 B2
(45) Date of Patent: Jan. 19, 2010

(54) STATOR HAVING AN INTERPHASE INSULATOR

(75) Inventors: Hiroshi Fukasaku, Kariya (JP); Minoru Mera, Kariya (JP); Kiyoshi Uetsuji, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 145 days.

(21) Appl. No.: 12/002,986

(22) Filed: Dec. 18, 2007

(65) Prior Publication Data

US 2008/0174197 A1   Jul. 24, 2008

(30) Foreign Application Priority Data

Dec. 21, 2006   (JP) .............................. 2006-344254

(51) Int. Cl.
*H02K 3/34* (2006.01)

(52) U.S. Cl. ...................... 310/215; 29/606; 174/138 E (58) Field of Classification Search ................. 310/215, 310/184, 260, 270; 29/596, 605, 606; 174/138 E, 174/138 R
See application file for complete search history.

(56) References Cited

U.S. PATENT DOCUMENTS

| | | | | |
|---|---|---|---|---|
| 2,701,317 A | * | 2/1955 | Herman ...................... 310/215 |
| 4,263,475 A | * | 4/1981 | McNeal ................... 174/138 E |
| 4,389,584 A | * | 6/1983 | Burns .......................... 310/43 |
| 4,455,743 A | * | 6/1984 | Witwer et al. .................. 29/596 |
| 5,093,543 A | * | 3/1992 | Patton et al. ............. 174/138 E |
| 6,995,491 B2 | * | 2/2006 | Kimura et al. ............... 310/215 |

FOREIGN PATENT DOCUMENTS

| | | |
|---|---|---|
| JP | 58-41034 | 3/1983 |
| JP | 58-119739 | 7/1983 |
| JP | 2006-149003 | 6/2006 |

* cited by examiner

*Primary Examiner*—Dang D Le
(74) *Attorney, Agent, or Firm*—Locke Lord Bissell & Liddell LLP

(57) ABSTRACT

A stator includes a first through a third windings, and a first and a second interphase insulators. The first interphase insulator has a first pair of strip-shaped insulating sheets and a first connecting portion. End portions of the insulating sheets are connected to the respective opposite end portions to form joints. The first connecting portion connects the insulating sheets so that the joints are shifted so as to be disposed in a region avoiding an interference with the first winding on both of a lead-extending side and the opposite side. In the second interphase insulator similarly constructed, a second connecting portion connects a second pair of the strip-shaped insulating sheets so that joints are shifted so as to be disposed in a region avoiding an interference with the third winding on both of the lead-extending side and the opposite side.

5 Claims, 9 Drawing Sheets

STATOR HAVING AN INTERPHASE INSULATOR

BACKGROUND OF THE INVENTION

The present invention relates to a stator, and more particularly to a stator having an interphase insulator for insulating phase windings from one another.

Figure 8:
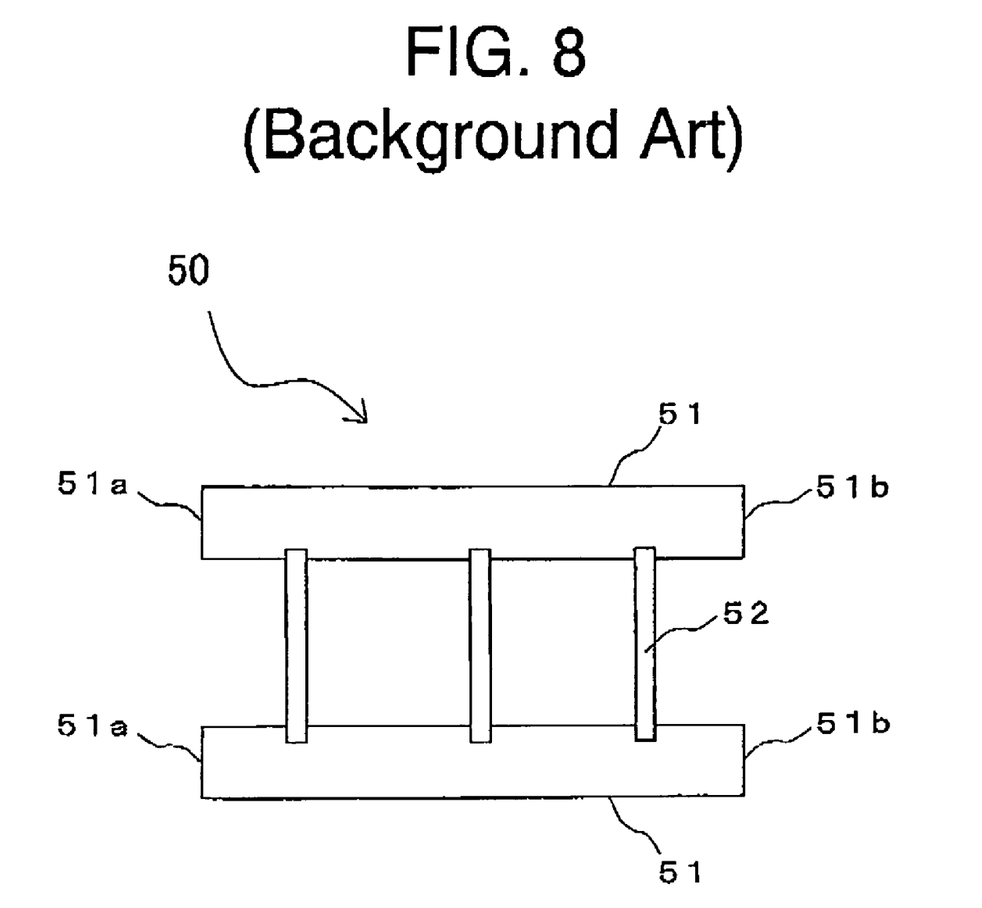
FIG. 8 is an interior elevation view of an interphase insulator for a stator in a background art.
Figure 9:
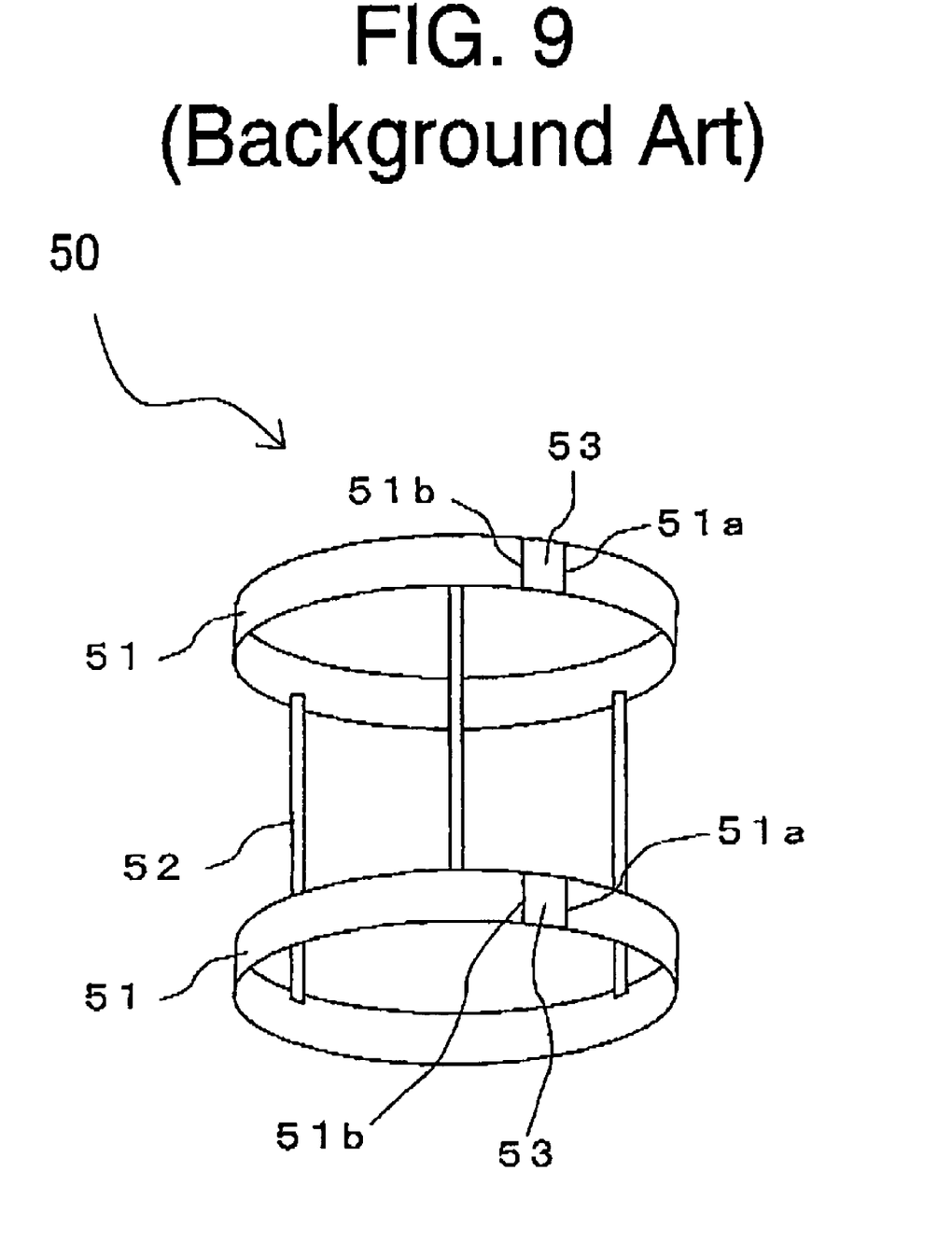
FIG. 9 is a perspective view of the interphase insulator of the stator in a state where the interphase insulator is utilized in the background art.

Unexamined Japanese Patent Publication No. 58-119739 discloses an example of an interphase insulator for insulating phase windings of a stator as a background art. Such an interphase insulator 50 is shown in FIG. 8. The interphase insulator is formed by connecting a pair of strip-shaped insulating sheets 51 with connecting portions 52 so that the phase windings are insulated from each other on both of the lead-extending side of the stator and the opposite side. Each of the connecting portions 52 is adjusted its length depending on the thickness of the laminated layer of the stator core, therefore, the pair of the strip-shaped insulating sheets 51 is arranged parallelly and spaced apart with each other. When such interphase insulators are utilized for a stator, the opposite end portions 51a, 51b of each of the strip-shaped insulating sheets 51 are adhered with each other so as to form joints 53 thereby forming a cylindrical body as shown in FIG. 9.

When the pair of strip-shaped insulating sheets 51 is connected by the connecting portions 52 with each other so that the opposite end portions 51a, 51b are arranged symmetrically, the joints 53 of the strip-shaped insulating sheets 51 are positioned coincident with each other as viewed in the axial direction of the cylindrical body. When such interphase insulators 50 are utilized for a stator in which each phase windings are inserted into slots of the stator core in wave winding form, the joints 53 of the strip-shaped insulating sheets 51 may interfere with the windings at either the lead-extending side of the stator or the opposite side. Accordingly, the interphase insulator 50 may be torn or broken.

The present invention is directed to a stator having an interphase insulator that is not torn easily.

SUMMARY OF THE INVENTION

According to the present invention, a stator includes a stator core with a plurality of slots. The stator has a lead-extending side and the opposite side. The stator includes a first winding, a second winding, a third winding, a first interphase insulator and a second interphase insulator. The first, the second, the third windings are inserted in this order into the slots corresponding to the respective windings and arranged in the circumferential direction of the stator in wave winding form. The first interphase insulator has a first pair of strip-shaped insulating sheets and a first connecting portion. The first pair of the strip-shaped insulating sheets is connected with the first connecting portion so as to be spaced apart with each other at a predetermined distance. The second interphase insulator has a second pair of strip-shaped insulating sheets and a second connecting portion. The second pair of the strip-shaped insulating sheets is connected with the second connecting portion so as to be spaced apart with each other at a predetermined distance. End portions of the first pair of the strip-shaped insulating sheets are connected to the respective opposite end portions to form a first joint and a second joint. The first connecting portion connects the first pair of the strip-shaped insulating sheets in such a manner that the first joint is shifted in the clockwise direction of the stator from the second joint so that the first and the second joints are disposed in a region avoiding an interference with the first winding on both of the lead-extending side and the opposite side. End portions of the second pair of the strip-shaped insulating sheets are connected to the respective opposite end portions to form a third joint and a fourth joint. The second connecting portion connects the second pair of the strip-shaped insulating sheets in such a manner that the third joint is shifted in the clockwise direction of the stator from the fourth joints so that the third and the fourth joints are disposed in a region avoiding an interference with the third winding on both of the lead-extending side and the opposite side.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
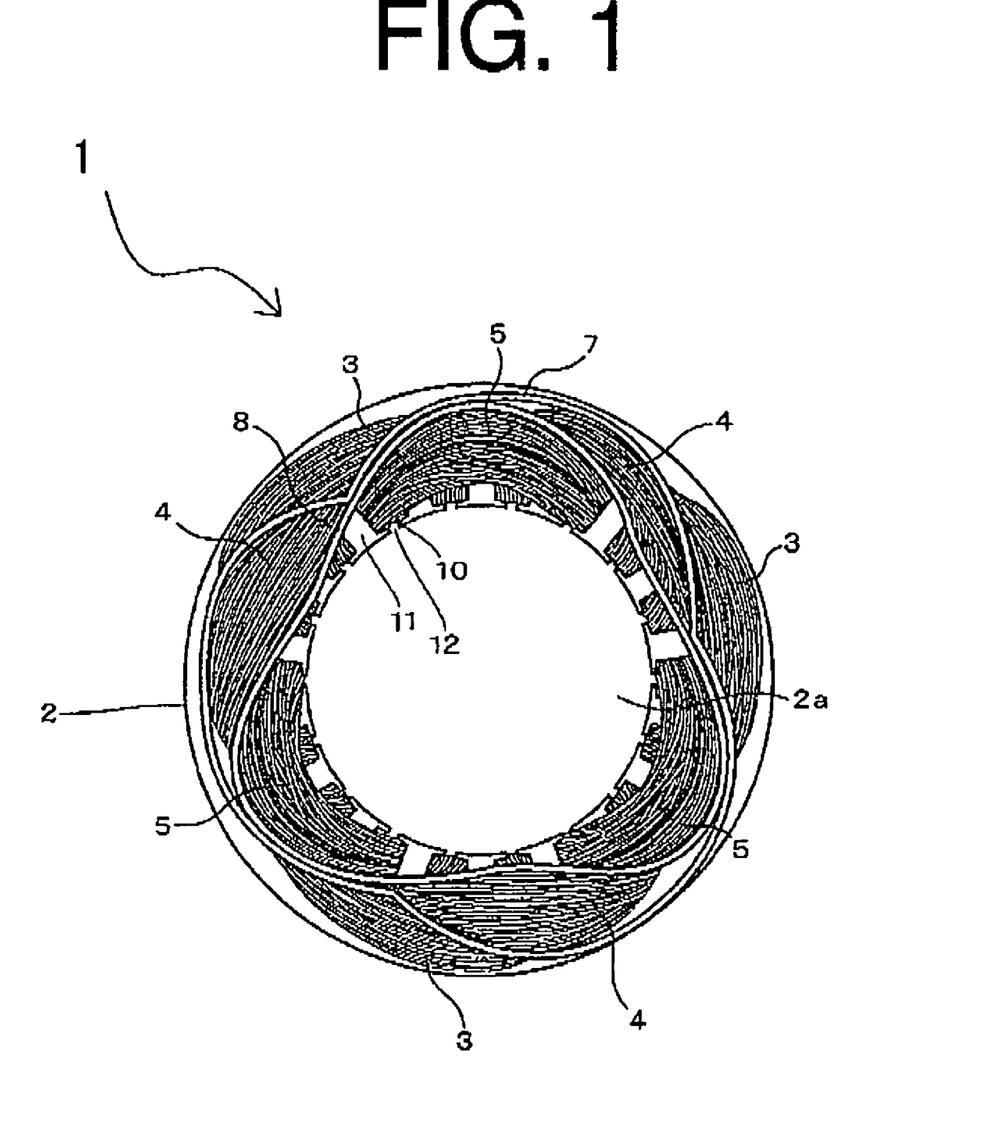
FIG. 1 is an plan view of a stator on a lead-extending side according to a preferred embodiment of the present invention.

The following will describe a preferred embodiment according to the present invention. FIG. 1 shows a plan view of a stator on a lead-extending side where leads extend. The stator includes a cylindrical stator core 2, a U-phase winding 3, a V-phase winding 4, a W-phase winding 5, a first interphase insulator 7, and a second interphase insulator 8. The U-phase winding 3, V-phase winding 4 and the W-phase winding 5 are composed of plural conductors covered with enamel. The first and second interphase insulators 7, 8 are made of polyethylene naphthalate (PEN).

The stator core 2 has a hollow portion 2a with a cylindrical shape and eighteen teeth 11 protruding toward the hollow portion 2a and aligned in the circumferential direction at regular intervals. Each slot 10 is defined by each two adjacent teeth 11. Thus, eighteen slots 10 are circumferentially arranged at regular intervals. That is, any two adjacent slots 10 are spaced from each other in the circumferential direction of the stator core 2 at an angular interval of 20°. Each tooth 11 has a T-shaped cross section perpendicular to the axis of the stator core 2, respectively. Therefore, eighteen slits 12 are formed so as to connect the slots 10 and the hollow portion 2a in the stator core 2. Both ends of each slot 10 are open to the outside of the stator core 2 for allowing a phase winding to pass therethrough from one end toward the other end.

The U-phase winding 3 is inserted in one of the slots 10 from one end to the other end, then is inserted in the reverse direction in the another one of the slots 10, which is spaced by two of the slots 10, or, at an interval of 60°. Thus, the U-phase winding 3 is inserted in the corresponding six slots 10 which are spaced at an angular interval of 60° in the circumferential direction of the stator core 2. The process is repeated, and the U-phase winding 3 is inserted in six slots 10 sequentially in wave winding form. The V-phase winding 4 and the W-phase winding 5 are inserted in the same way in the six slots 10 which correspond to the respective phase windings 4, 5, sequentially. The U-phase winding 3 which is inserted firstly constitutes a first winding, and the V-phase winding 4 which is inserted secondly constitutes a second winding, and the W-phase winding 5 which is inserted thirdly constitutes a third winding.

At the coil end of the stator 1, two interphase insulators, that is, a first and a second interphase insulators 7, 8 are utilized for insulating the phase windings 3 through 5 from one another. The first interphase insulator 7 is provided between the U-phase winding 3 and the V-phase winding 4 and between the U-phase winding 3 and the W-phase winding 5. The second interphase insulator 8 is provided between the W-phase winding 5 and the U-phase winding 3 and between the W-phase winding 5 and the V-phase winding 4. Therefore, the U-phase winding 3 and the V-phase winding 4 are insulated by the first interphase insulator 7, and the V-phase winding 4 and the W-phase winding 5 are insulated by the second interphase insulator 8. Further, the W-phase winding 5 and the U-phase winding 3 are insulated by the first and the second interphase insulators 7, 8.

Figure 2:
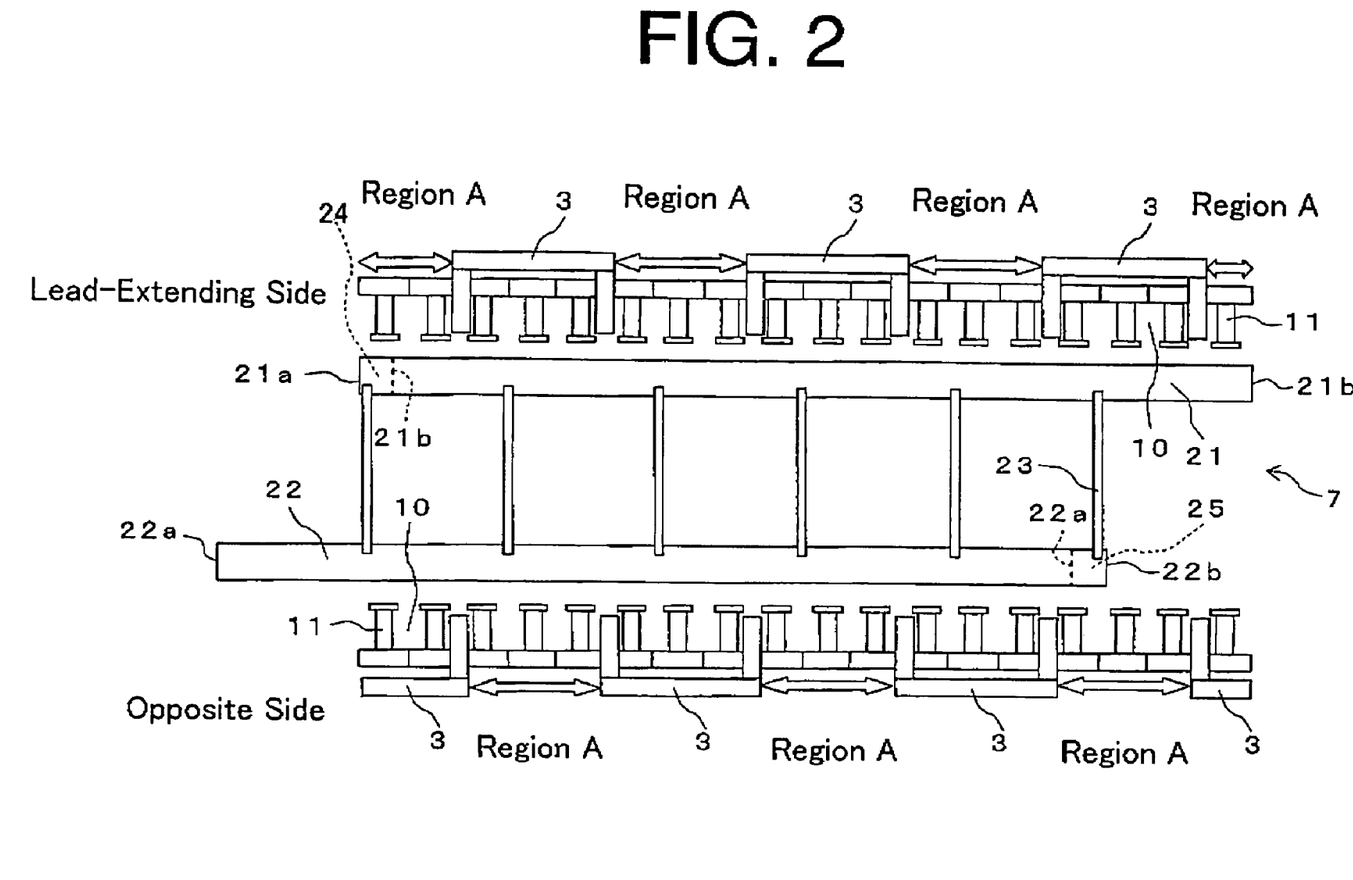
FIG. 2 is an interior elevation view of a first interphase insulator for the stator according to the preferred embodiment.

The following will describe the structure of the first interphase insulator 7. Referring to FIG. 2, the first interphase insulator 7 includes a pair of strip-shaped insulating sheets 21, 22 and six connecting portions 23. The strip-shaped insulating sheets 21, 22 are made of polyethylene naphthalate (PEN) in the form of a film. The connecting portions 23 connect the pair of strip-shaped insulating sheets 21, 22 so that the pair of the strip-shaped insulating sheets 21, 22 is parallelly aligned and spaced with each other at a predetermined distance. The connecting portions 23 are made of polyethylene naphthalate (PEN) in the form of a film in the similar way to the strip-shaped insulating sheets 21, 22. The connecting portions 23 are located at regular intervals in the longitudinal direction of the strip-shaped insulating sheets 21, 22 so as to extend perpendicular to the strip-shaped insulating sheets 21, 22. The distance between the strip-shaped insulating sheets 21, 22 is determined by adjusting the length of the connecting portions 23 so as to dispose the strip-shaped insulating sheets 21, 22 at the both coil ends adequately. That is, the strip-shaped insulating sheet 21 is positioned at one of the coil end of the stator 1, and the strip-shaped insulating sheet 22 is positioned at the other coil end of the stator 1, as shown in FIG. 1. In other words, the strip-shaped insulating sheet 21 is positioned at the lead-extending side of the stator 1 where the leads extend, and the strip-shaped insulating sheet 22 is positioned at the opposite side of the stator 1 where the leads do not extend.

Figure 3:
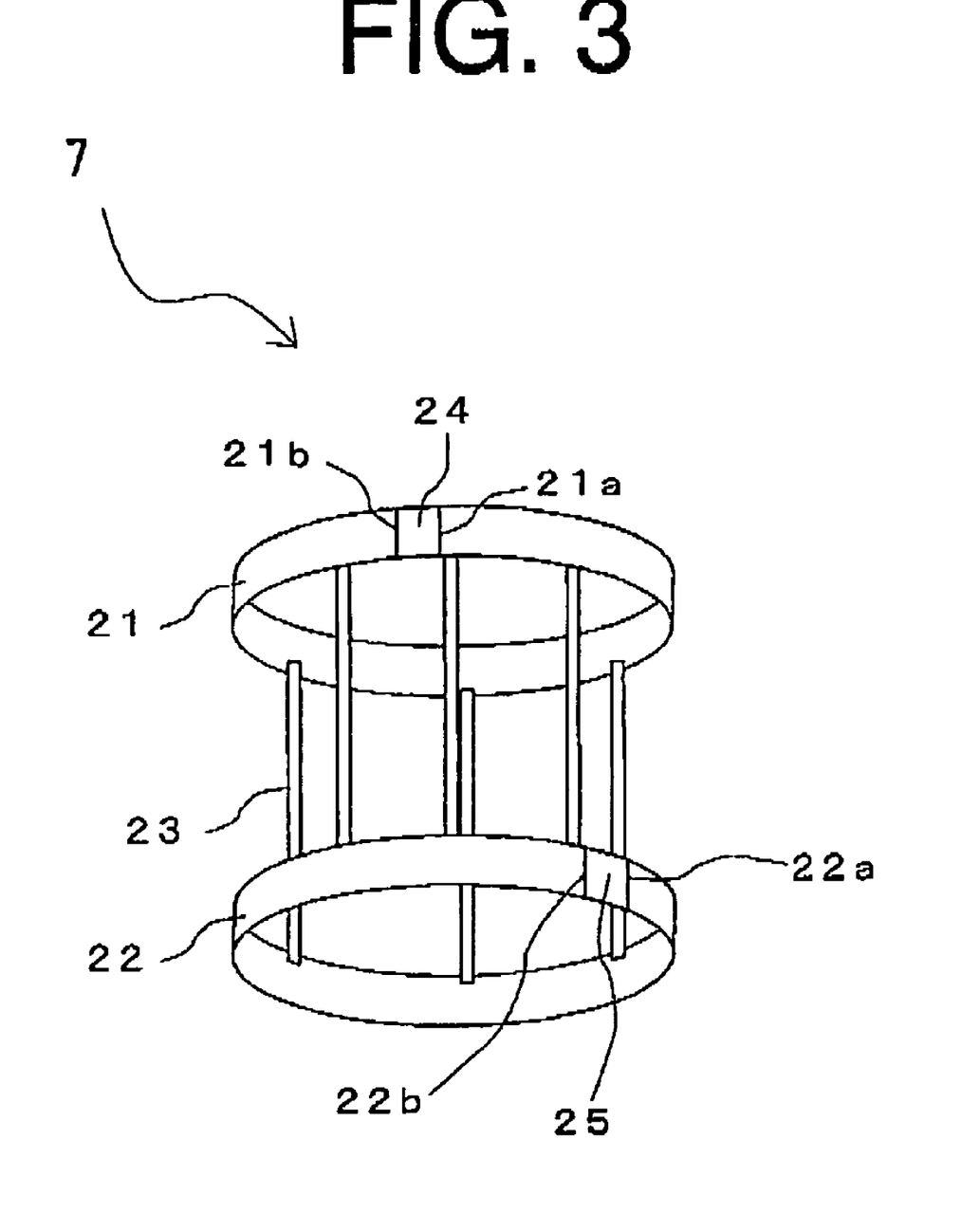
FIG. 3 is a perspective view of the first interphase insulator for the stator according to the preferred embodiment in a state where the first interphase insulator is utilized.

In the first interphase insulator 7, the strip-shaped insulating sheets 21, 22 are connected by the six connecting portions 23 so that the end portions 22a, 22b of the insulating sheet 22 are shifted leftward from the end portions 21a, 21b of the other insulating sheet 21 on the drawing of FIG. 2. In other words, the strip-shaped insulating sheets 21, 22 are disposed in a staggered arrangement. When the first interphase insulator 7 is utilized in the stator 1, the opposite end portions 21a and 21b are overlapped and adhered so as to form a first joint 24, thereby the strip-shaped insulating sheet 21 forms a cylindrical shape, as shown in FIG. 3. In the same way, the opposite end portions 22a, 22b are overlapped and adhered so as to form a second joint 25, thereby the strip-shaped insulating sheet 22 forms a cylindrical shape. With the positional relation between the strip-shaped insulating sheets 21, 22, the first joint 24 of the end portions 21a, 21b is shifted in the clockwise direction of the cylindrical interphase insulator 7 from the second joint 25 of the end portions 22a, 22b as viewed from the lead-extending side.

The positional relation between the first joint 24 and the second joint 25 will be described in detail. FIG. 2 shows the schematic elevation view of the coil ends of the stator 1 on the lead-extending side and the opposite side. FIG. 2 illustrates not only a state before forming the first interphase insulator 7 into the cylindrical shape, but also the positional relation of the strip-shaped insulating sheets 21, 22 in the stator 1. Namely, the elevation view illustrates that only the U-phase winding 3 is inserted in the slots 10 in the wave winding form. The positions where the U-phase winding 3 exists at the coil ends are alternated on the lead-extending side and the opposite side, due to the insertion of the U-phase winding 3 in the slots 10 in the waving winding form. In case the first and the second joints 24, 25 are disposed at the positions where the U-phase winding 3 at the coil ends of the stator 1, the joints 24 and 25 may interfere with the U-phase winding 3 and the V-phase winding 4. Accordingly the joints 24, 25 may be easily disjointed or separated, when the V-phase winding 4 is inserted in the slots 10 (as shown in FIG. 1). Therefore, the position of the strip-shaped insulating sheets 21, 22 is adjusted so that each of the joints 24, 25 is positioned so as not to be in contact with the U-phase winding 3, considering the location of the U-phase winding 3 at the lead-extending side and the opposite side of the stator 1. In other words, the joints 24, 25 are positioned at regions A where the U-phase winding 3 does not exist, as shown in FIG. 2. The regions A are defined between the positions of the U-phase winding 3, and are the regions avoiding an interference with the U-phase winding 3. That is, due to the positional relation of the joints 24, 25, the joints 24, 25 do not interfere with the U-phase winding 3 and the V-phase winding 4 at the lead-extending side and the opposite side, and the strip-shaped insulating sheets 21, 22 are not torn or broken easily.

Figure 4:
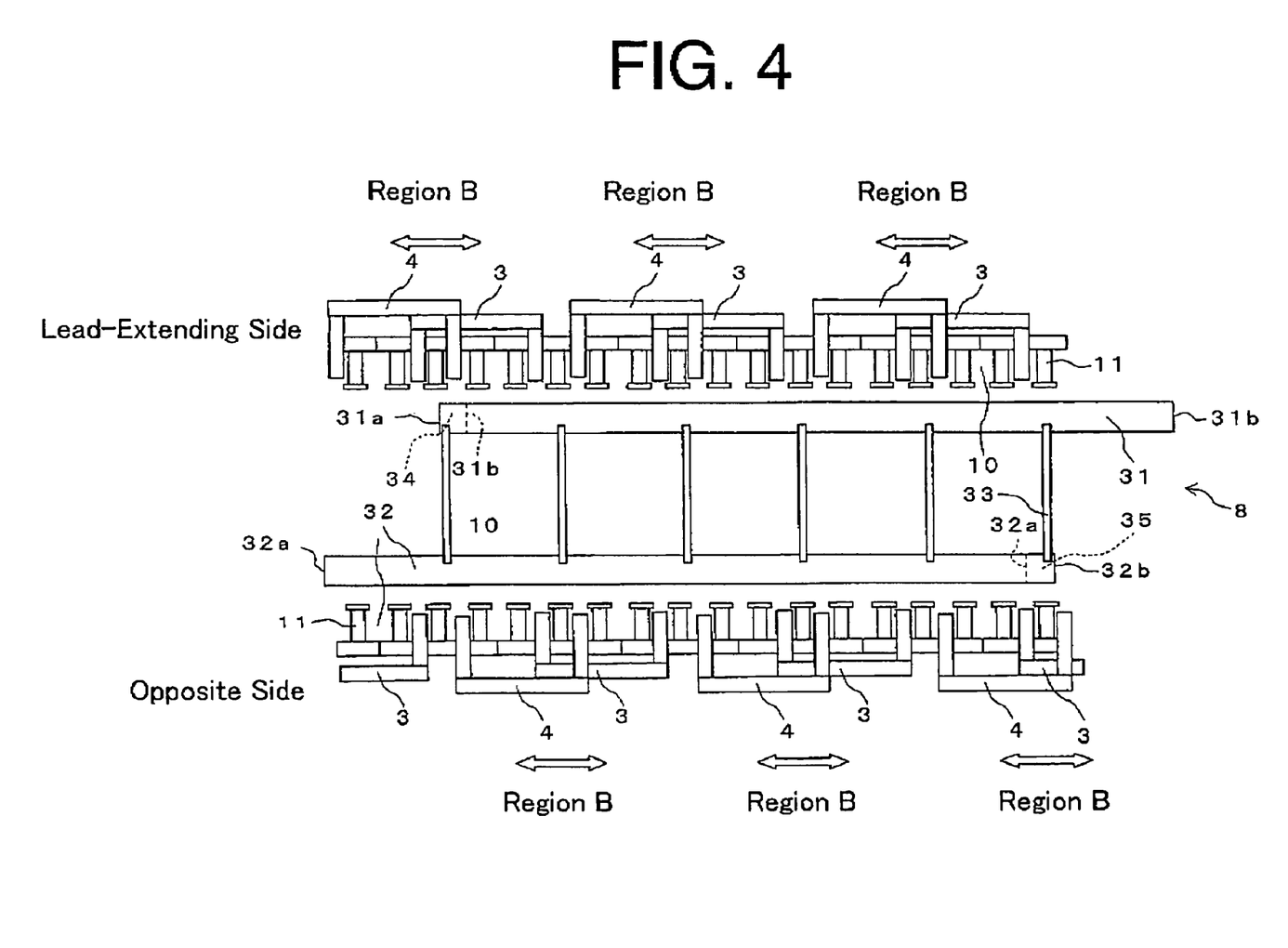
FIG. 4 is an interior elevation view of a second interphase insulator for the stator according to the preferred embodiment.

The following will describe the structure of the second interphase insulator 8. Referring to FIG. 4, the second interphase insulator 8 includes a pair of strip-shaped insulating sheets 31, 32 and six connecting portions 33, in the similar way with the first interphase insulator 7. The strip-shaped insulating sheets 31, 32 are made of polyethylene naphthalate (PEN) in the form of a film. The connecting portions 33 connect the pair of strip-shaped insulating sheets 31, 32 at a predetermined distance. In the similar way with the first interphase insulator 7, the strip-shaped insulating sheets 31, 32 are connected by the six connecting portions 33 so that the end portions 32a, 32b the insulating sheet 32 are shifted leftward from the end portions 31a, 31b of the other insulating sheet 31 on the drawing of FIG. 4. In other words, the strip-shaped insulating sheets 31, 32 are disposed in a staggered arrangement. When the second interphase insulator 8 is utilized in the stator 1 (as shown in FIG. 1), the end portions 31a, 31b are overlapped and adhered with each other so as to form a third joint 34, thereby the strip-shaped insulating sheet 31 forms a cylindrical shape. In the same way, the end portions 32*a* and 32*b* are overlapped and adhered with each other so as to form a fourth joint 35, thereby the strip-shaped insulating sheet 32 forms a cylindrical shape.

The following will describe in detail the positional relation of the third joint 34 formed by the opposite end portions 31*a*, 31*b* and the fourth joint 35 formed by the opposite end portions 32, 32*b*. FIG. 4 shows the schematic elevation view of the coil ends of the stator 1 on the lead-extending side and the opposite side. FIG. 4 illustrates not only a state before forming the second interphase insulator 8 into the cylindrical shape, but also the positional relation of the strip-shaped insulating sheets 31, 32 in the stator 1 (as shown in FIG. 1). Namely, the elevation view illustrates that the U-phase winding 3 and the V-phase winding 4 are inserted in the slots 10 in the wave winding form, but the first interphase insulator 7 is omitted. The slots into which the W-phase winding 5 is inserted is denoted as slots 10*c* (shown in FIG. 6A, 6B). In case the third and the fourth joints 34, 35 are positioned at the slot 10*c*, the joints 34, 35 may interfere with the U-phase winding 3, the V-phase winding 4, and the W-phase winding 5 (as shown in FIG. 1). Accordingly the joints 34, 35 may be disjointed or separated, when the W-phase winding 5 is inserted in the slots 10*c*. The positions of the slots 10*c* into which the W-phase winding 5 is inserted are alternated on the lead-extending side and the opposite side, due to the insertion of the phase windings 3, 4, 5 into the slots 10 in the waving winding form. Therefore, the position of the insulating sheets 31, 32 is adjusted so that the joints 34, 35 is positioned respectively so as not to be in contact with the W-phase winding 5, considering the location of the slots 10*c* for the W-phase winding 5 at the lead-extending side and the opposite side. In other words, the joints 34, 35 are positioned at regions B where the W-phase winding 5 does not exist, as shown in FIG. 4. The regions B are defined between the slots 10*c* for the W-phase winding, and are the regions avoiding the interference with the W-phase winding 5. That is, due to the positional relation of the joints 34, 35, the joints 34, 35 do not interfere with the phase winding 3, 4, 5 at the lead-extending side and the opposite side, and the strip-shaped insulating sheets 31, 32 are not to be torn or broken easily.

Figure 5A:
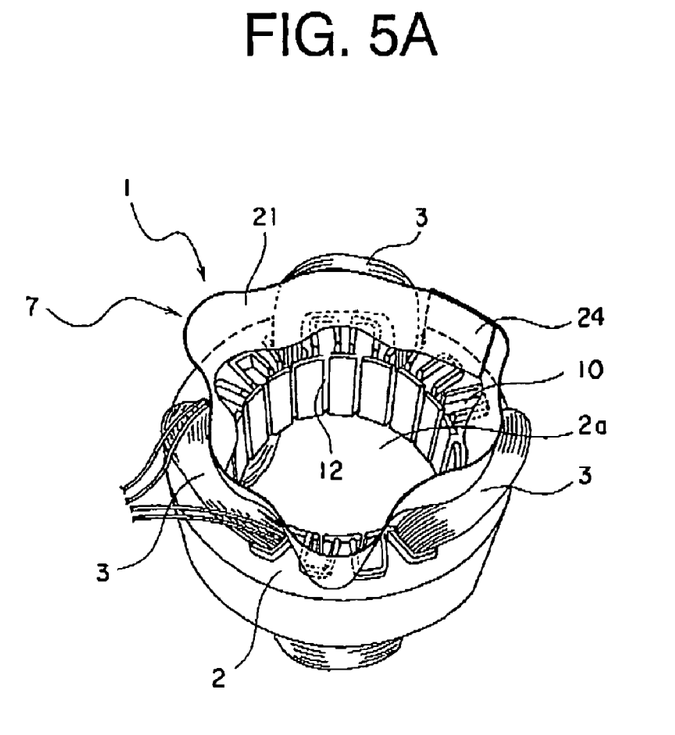
FIGS. 5A and 5B are a perspective view for illustrating a process for manufacturing the stator of the preferred embodiment.
Figure 5B:
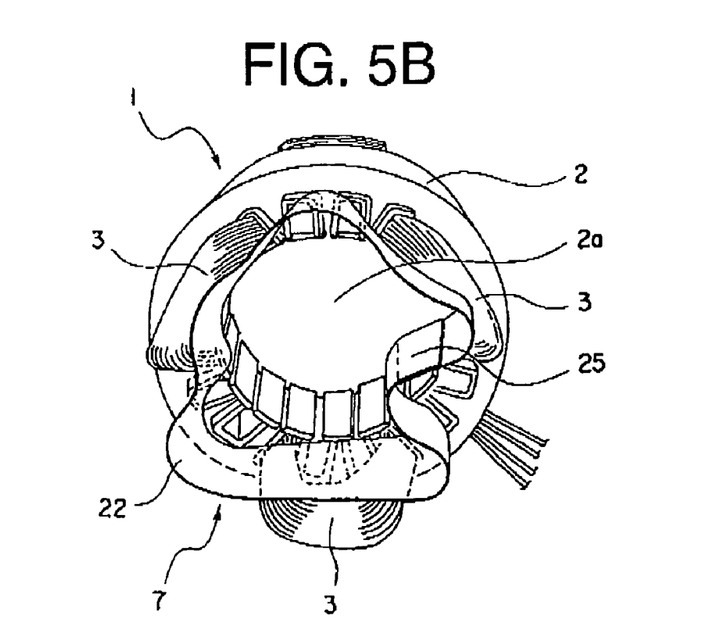

The following will describe the process for manufacturing the stator 1. As shown in FIG. 5A, 5B, the U-phase winding 3 is inserted into the corresponding slots 10 in wave winding form. Then, the first interphase insulator 7 is placed in the stator 1 in such a manner that the cylindrically formed strip-shaped insulating sheet 22 is inserted into the hollow portion 2*a* from the lead-extending side of the stator 1. The connecting portions 23 (not shown in FIG. 5A nor 5B, but shown in FIG. 2 or FIG. 3) are inserted into the slots 10 through the slits 12. As shown in FIG. 5A, the first joint 24 is disposed at the position where the first joint 24 is not in contact with the U-phase winding 3 at the lead-extending side. In such an arrangement, the second joint 25 is accordingly disposed at the position where the second joint 25 is not in contact with the U-phase winding 3 at the opposite side as shown in FIG. 5B.

Figure 6A:
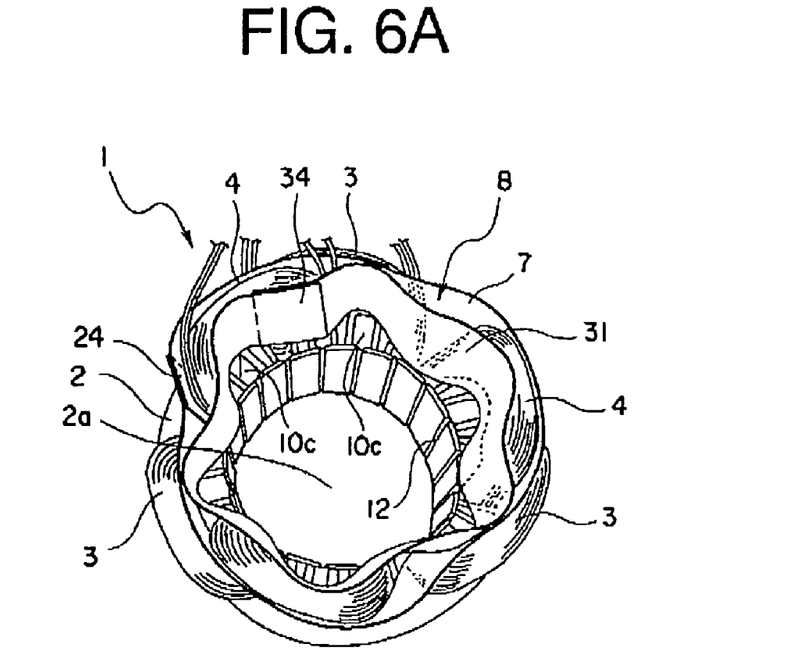
FIGS. 6A and 6B are another perspective view for illustrating a process for manufacturing the stator of the preferred embodiment.
Figure 6B:
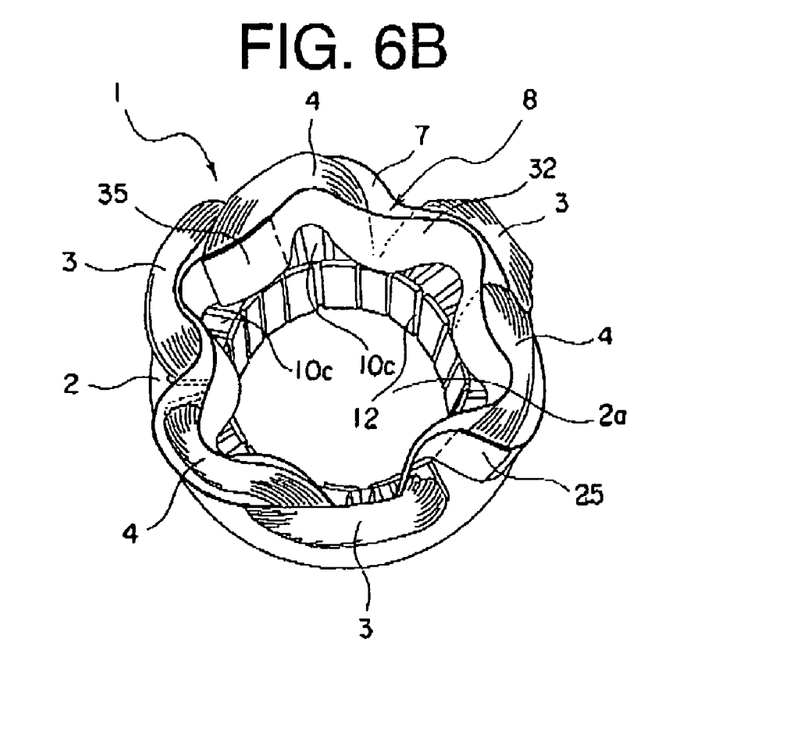
Figure 7:
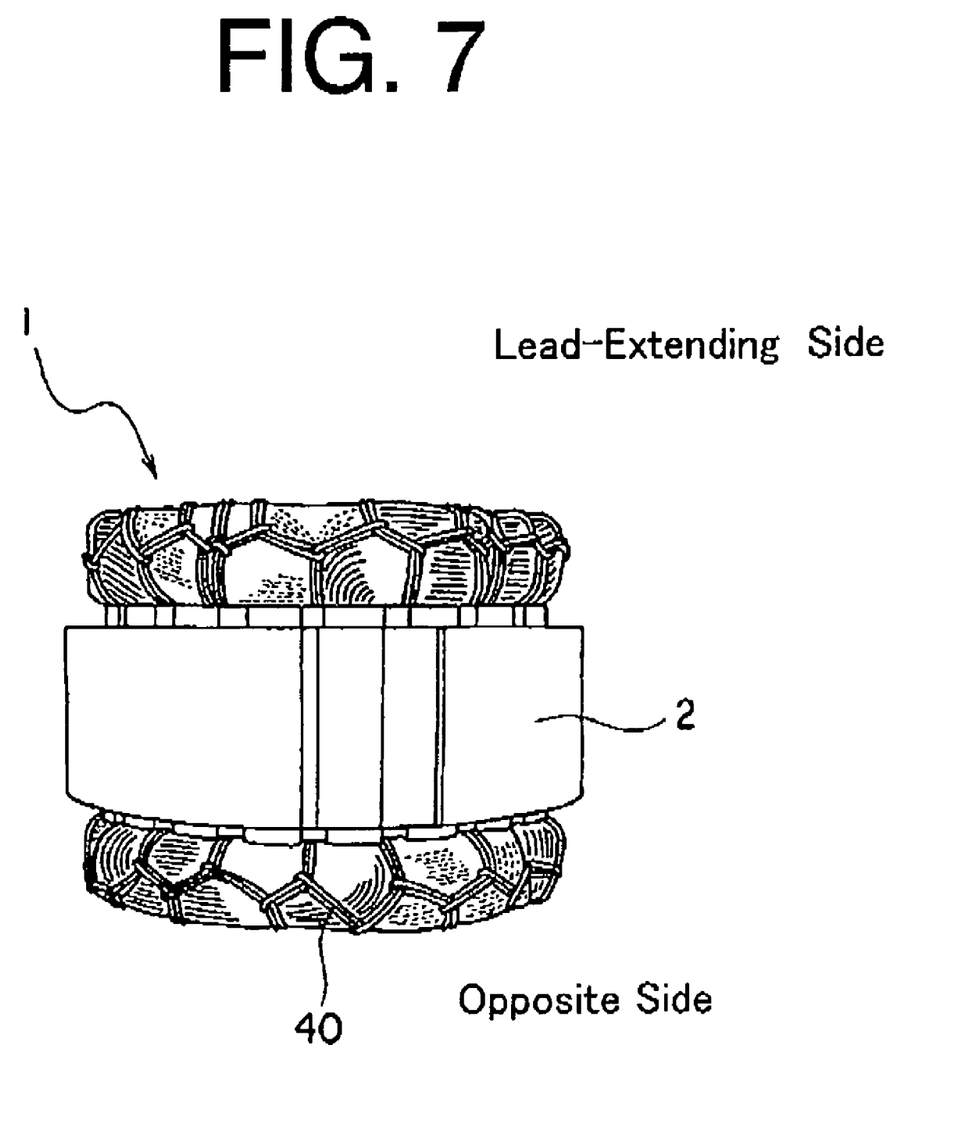
FIG. 7 is a side view of the stator of the preferred embodiment.

After the first interphase insulator 7 is placed in the stator 1, the V-phase winding 4 is inserted into the corresponding slots 10 in the wave winding form, as shown in FIG. 6A, 6B. Then, the second interphase insulator 8 is placed in the stator 1 in such a manner that the cylindrically formed strip-shaped insulating sheet 32 is inserted into the hollow portion 2*a* from the lead-extending side of the stator 1. The connecting portions 33 (shown in FIG. 4) are inserted into the slots 10 through the slits 12 in the similar way with the first interphase insulator 7. The joint 34 is disposed at the position where the joint 34 is not in contact with the W-phase winding 5 at the lead-extending side. The joint 34 is located between the slots 10*c* for the W-phase winding 5, as shown in FIG. 6A. In such an arrangement, the joint 35 is accordingly disposed at the position where the joint 35 is not in contact with the W-phase winding 5 at the opposite side, as shown in FIG. 6B.

Then, after the W-phase winding 5 is inserted into the slots 10*c* for the W-phase winding 5 in the wave winding form, provisional lacing process is performed in such a manner that the phase windings 3, 4, 5 are tied and fixed by a thread 40. Then shaping process of the coil ends is performed in such a manner that the clearances and the like between the stator core 2 and the phase windings 3, 4, 5 are reduced. Thus, the stator 1 is completed.

As described above, the stator core 2 has a plurality of slots 10, and the U-phase winding 3, the V-phase winding 4, and the W-phase winding 5 are in this order inserted in the corresponding slots 10 of the stator core 2. Therefore, in the stator core 2, the U-phase winding 3, the V-phase winding 4, and the W-phase winding 5 are in this order arranged in the circumferential direction of the stator 1 in the wave winding form, The stator 1 includes the first interphase insulator 7 and the second interphase insulator 8. The first interphase insulator 7 includes the pair of the strip-shaped insulating sheets 21, 22, and the connecting portions 23 connecting the insulating sheets 21, 22 at a predetermined distance. The second interphase insulator 8 includes the pair of the strip-shaped insulating sheet 31, 32 and the connecting portions 33 connecting the insulating sheets 31, 32 at a predetermined distance. In the first interphase insulator 7, the pair of strip-shaped insulating sheets 21, 22 is connected by the connecting portions 23 in a shifted manner. That is, the first joint 24 of the end portions 21*a*, 21*b* of the insulating sheet 21 is shifted in the clockwise direction of the stator 1 from the second joint 25 of the end portions 22*a*, 22*b* of the insulating sheet 22 as viewed from the lead-extending side. In the second interphase insulator 8, the pair of strip-shaped insulating sheets 31, 32 is connected by the connecting portions 33 in a shifted manner. That is, the joint 34 of the end portions 31*a*, 31*b* of the insulating sheet 31 is shifted in the clockwise direction of the stator 1 from the joint 35 of the end portions 32*a*, 32*b* of the insulating sheet 32 as viewed from the lead-extending side. Therefore, on the lead-extending side and the opposite side, the joints 24, 25 of the insulating sheets 21,22 are positioned respectively in the regions A where the joints 24, 25 are not in contact with the U-phase winding 3. Similarly, the joints 34, 35 of the strip-shaped insulating sheets 31,32 are positioned respectively in the regions B where the joints 34, 35 are not in contact with and the W-phase winding 5 on the lead-extending side and the opposite side. Thus, the joints 24, 25, 34, 35 are prevented from interfering with the U-phase winding 3, the V-phase winding 4, and the W-phase winding 5 and therefore prevented from being disjointed or broken.

In this embodiment, the stator has six poles and eighteen slots, as an example, but the stator is not limited to this embodiment. A stator with four poles and twelve slots, or a stator with eight poles and twenty-four slots, or the like may be applied. Such a stator may be applied as long as the joints of the insulating sheets of the first interphase insulator are positioned in the regions where the joints are not in contact with the U-phase winding, and the joints of the insulating sheets of the second interphase insulator are positioned in the regions where the joints are not in contact with the W-phase winding.

The strip-shaped insulating sheets 21, 22 and the connecting portions 23 are made of polyethylene naphthalate (PEN), but is not limited. The strip-shaped insulating sheets 21, 22 and the connecting portions 23 may be made of polyethylene terephthalate (PET), polyphenylene sulfide (PPS) or any other material as long as it functions to insulate the phase windings from one another satisfactorily. The strip-shaped insulating sheets 21, 22 and the connecting portions 23 may be made of different materials with each other. The number of the connecting portions is not limited to six, but other numbers of connecting portions may be provided depending on the configuration of the stator.

In this embodiment, the U-phase winding 3 constitutes the first winding, and the V-phase winding 4 constitutes the second winding, and the W-phase winding 5 constitutes the third winding, but the construction is not limited. The U-phase winding 3, the V-phase winding 4, and the W-phase winding 5 are not necessarily inserted in the slots 10 in this order. Any phase windings may be inserted in the slots in an adequate order. The winding which is firstly inserted in the slots 10 may correspond to the first winding, and the winding secondly inserted in the slots 10 may correspond to the second winding, and the winding thirdly inserted in the slots 10 may correspond to the third winding.

The present examples and embodiments are to be considered as illustrative and not restrictive, and the invention is not to be limited to the details given herein but may be modified within the scope of the appended claims.

What is claimed is:

1. A stator having a stator core with a plurality of slots, the stator having a lead-extending side and the opposite side, the stator comprising:
   a first winding inserted firstly into the slots corresponding to the first winding;
   a second winding inserted secondly into the slots corresponding to the second winding;
   a third winding inserted thirdly into the slots corresponding to the third winding; wherein the first, the second and the third windings are arranged in the circumferential direction of the stator in wave winding form;
   a first interphase insulator having a first pair of strip-shaped insulating sheets and a first connecting portion, wherein the first pair of the strip-shaped insulating sheets is connected with the first connecting portion so as to be spaced apart with each other at a predetermined distance;
   a second interphase insulator having a second pair of strip-shaped insulating sheets and a second connecting portion, wherein the second pair of the strip-shaped insulating sheets is connected with the second connecting portion so as to be spaced apart with each other at a predetermined distance;
   wherein end portions of the first pair of the strip-shaped insulating sheets are connected to the respective opposite end portions to form a first joint and a second joint, wherein the first connecting portion connects the first pair of the strip-shaped insulating sheets in such a manner that the first joint is shifted in the clockwise direction of the stator from the second joint so that the first and the second joints are disposed in a region avoiding an interference with the first winding on both of the lead-extending side and the opposite side;
   wherein end portions of the second pair of the strip-shaped insulating sheets are connected to the respective opposite end portions to form a third joint and a fourth joint, wherein the second connecting portion connects the second pair of the strip-shaped insulating sheets in such a manner that the third joint is shifted in the clockwise direction of the stator from the fourth joint so that the third and the fourth joints are disposed in a region avoiding an interference with the third winding on both of the lead-extending side and the opposite side.

2. The stator according to claim 1, wherein the first interphase insulator is of a cylindrical shape and the second interphase insulator is of a cylindrical shape.

3. The stator according to claim 1, wherein the first and the second interphase insulators are made of polyethylene naphthalate.

4. A method for manufacturing a stator having a stator core with a plurality of slots, the stator having a lead-extending side and the opposite side, comprising the steps of:
   connecting a first pair of strip-shaped insulating sheets by a first connecting portion so that the first pair of the strip-shaped insulating is spaced apart with each other at a predetermined distance and is disposed in a staggered arrangement;
   connecting end portions of the first pair of the strip-shaped insulating sheets to the respective opposite end portions so as to form a first joint and a second joint thereby forming a first interphase insulator in such a manner that the first joint is shifted in the clockwise direction of the stator from the second joint;
   connecting a second pair of the strip-shaped insulating sheets by a second connecting portion so that the second pair of the strip-shaped insulating sheets is spaced apart with each other at a predetermined distance and is disposed in a staggered arrangement;
   connecting end portions of the second pair of the strip-shaped insulating sheets to the respective opposite end portions so as to form a third joint and a fourth joint thereby forming a second interphase insulator in such a manner that the third joint is shifted in the clockwise direction of the stator from the fourth joint;
   inserting a first winding into the slots corresponding to the first winding;
   placing the first interphase insulator in the stator so that the first and the second joints are disposed in a region avoiding an interference with the first winding on both of the lead-extending side and the opposite side;
   inserting a second winding into the slots corresponding to the second winding;
   placing the second interphase insulator in the stator so that the third and the fourth joints are disposed in a region avoiding an interference with the third winding on both of the lead-extending side and the opposite side;
   inserting a third winding into the slots corresponding to the third winding.

5. The method for manufacturing the stator according to claim 4, further comprising the steps of:
   lacing provisionally by tying and fixing the first, the second, and the third windings by a thread; and
   shaping coil ends to reduce the clearances between the stator core and the windings.

* * * * *